(12) United States Patent
Zachmann (10) Patent No.: US 8,151,257 B2
(45) Date of Patent: Apr. 3, 2012

(54) MANAGING DIFFERENT VERSIONS OF SERVER COMPONENTS REGARDING COMPATIBILITY WITH COLLABORATING SERVERS

(75) Inventor: Guenter Zachmann, Rauenberg (DE)

(73) Assignee: SAP AG, Walldorf (DE)

( * ) Notice: Subject to any disclaimer, the term of this patent is extended or adjusted under 35 U.S.C. 154(b) by 1077 days.

(21) Appl. No.: 11/754,908

(22) Filed: May 29, 2007

(65) Prior Publication Data

US 2008/0301668 A1  Dec. 4, 2008

(51) Int. Cl.
*G06F 9/44* (2006.01)
(52) U.S. Cl. .................................................. 717/170
(58) Field of Classification Search ................. None
See application file for complete search history.

(56) References Cited

U.S. PATENT DOCUMENTS

| | | | | |
|---|---|---|---|---|
| 6,463,584 B1 * | 10/2002 | Gard et al. | ..................... | 717/171 |
| 7,506,336 B1 * | 3/2009 | Ninan | ........................... | 717/175 |
| 2003/0154472 A1 * | 8/2003 | Daase et al. | ................... | 717/176 |
| 2003/0233648 A1 * | 12/2003 | Earl et al. | ....................... | 717/176 |
| 2004/0068579 A1 * | 4/2004 | Marmigere et al. | .......... | 709/242 |
| 2004/0168153 A1 * | 8/2004 | Marvin | ........................... | 717/120 |
| 2005/0005268 A1 * | 1/2005 | Zilavy et al. | ................... | 717/170 |
| 2006/0212865 A1 * | 9/2006 | Vincent et al. | ................ | 717/168 |
| 2006/0282831 A1 * | 12/2006 | Toeroe | .......................... | 717/168 |

* cited by examiner

*Primary Examiner* — Anna Deng
*Assistant Examiner* — Adam R. Banes
(74) *Attorney, Agent, or Firm* — Blakely, Sokoloff, Taylor & Zafman, LLC (57) ABSTRACT

A system and method for determining whether a rolling update may be performed. The system receives a statement of compatibility for software running on collaborating servers. The statement of compatibility indicates which software versions are compatible with one another. The statement may be stored in a shared storage area that is accessible to each of the servers in the group. The statement may be updated at any time if compatibility issues are determined after release of a software version. The system and method check the statement of compatibility automatically upon the start of an update process for a server. If the statement of incompatibility indicates that the server starting up is incompatible with an operating server, the start up process is aborted.

15 Claims, 7 Drawing Sheets

MANAGING DIFFERENT VERSIONS OF SERVER COMPONENTS REGARDING COMPATIBILITY WITH COLLABORATING SERVERS

BACKGROUND

1. Field of the Invention

The embodiments of the invention relate to the management of updates to software in a group of collaborating servers. Specifically, the embodiments relate to a system for determining when collaborating servers are being updated to a version compatible with other servers allowing for a rolling update to be made.

2. Background

Servers are frequently organized in groups to collaborate with one another to provide a set of services to a group of client computers and applications. A set as used herein refers to any number of items including one item. The servers in the group typically run identical software components to one another for each service offered, that is, the servers each run the same version of a service or application component. Servers with identical versions of software components are compatible with one another. Compatibility indicates that the servers handle data and service clients in an equivalent manner such that data generated by one server can be used by another server. Often clients are transferred or distributed amongst a group of servers to balance load on the servers. Compatibility ensures that the clients have a seamless interaction if transferred between servers.

Figure 1A:
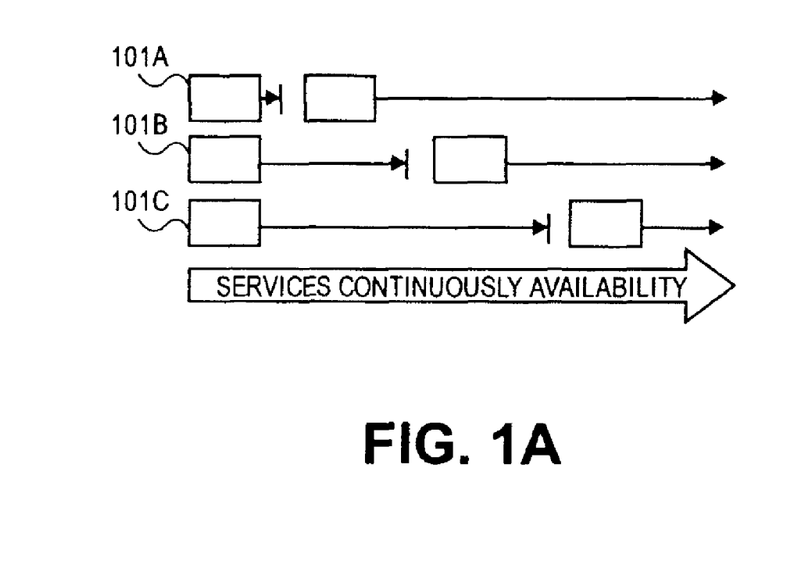
FIG. 1A is a diagram of a rolling update of a set of servers.

Servers are often expected to run continuously and downtime is sought to be minimized. However, when software is to be updated for a server it is taken down temporarily. If the updated software is incompatible, then the downtime may be more extensive. FIG. 1A is a diagram illustrating a scenario where updated software is backward compatible. Three servers 101A, 101B, 101C are operating in collaboration with one another. The first server 101A is halted to update its software and then restarted. The second server 101B is halted to update its software after the first server 101A has restarted. The third server 101C is halted and its software is updated after both the first server 101A and the second server 101B have restarted. At all times at least two servers out of the group of three servers are running and services are continuously provided to clients. This process is referred to as a rolling update and is possible when updated servers have software that is backward compatible with the other servers.

Figure 1B:
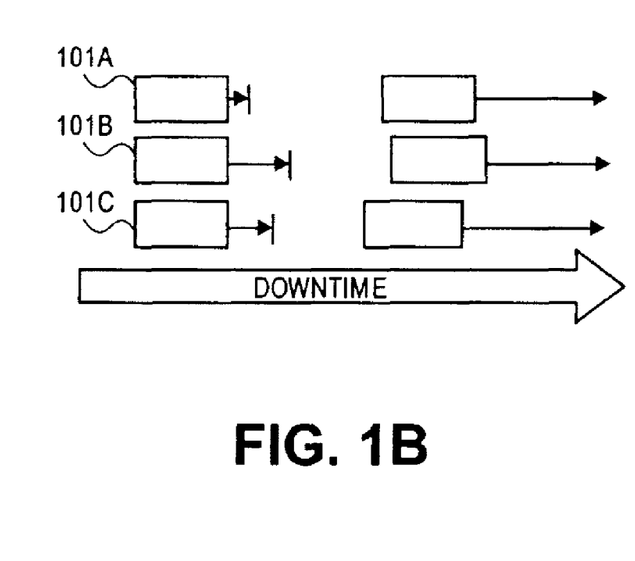
FIG. 1B is a diagram of a set of servers being updated in parallel.

FIG. 1B is a diagram illustrating a scenario where updated software is not backward compatible. Each server 101A, 101B, 101C must be halted at the same time and updated. This is referred to as a parallel update. During this time period no service is available to the clients. The server 101A, 101B, 101C must be updated at the same time because different software versions cannot run at the same time because they are not compatible and data would be lost or corrupted.

A determination of whether a rolling update can be performed is an entirely manual process. System administrators must work with the software vendors to determine whether backward compatibility exists and then update their machines accordingly. Also, there is no facility for handling the scenario where a software version initially believed to be compatible subsequently is discovered to have incompatibilities with other versions.

SUMMARY

A system and method for determining whether a rolling update can be performed. The system receives a statement of compatibility for software running on a server and collaborating servers. The statement of compatibility indicates which software versions are compatible with one another. The statement is stored in a shared storage area that is accessible to each of the servers in a group of collaborating servers. The statement can be updated at any time if compatibility issues are determined after release of a software version. The system and method checks the statement of compatibility automatically upon the start of an update process for a server. If the statement of incompatibility indicates that the server starting up is incompatible with an operating server, the start up process is aborted. Compatibility checks may also be made periodically after startup.

BRIEF DESCRIPTION OF THE DRAWINGS

Embodiments of the invention are illustrated by way of example and not by way of limitation in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Figure 2:
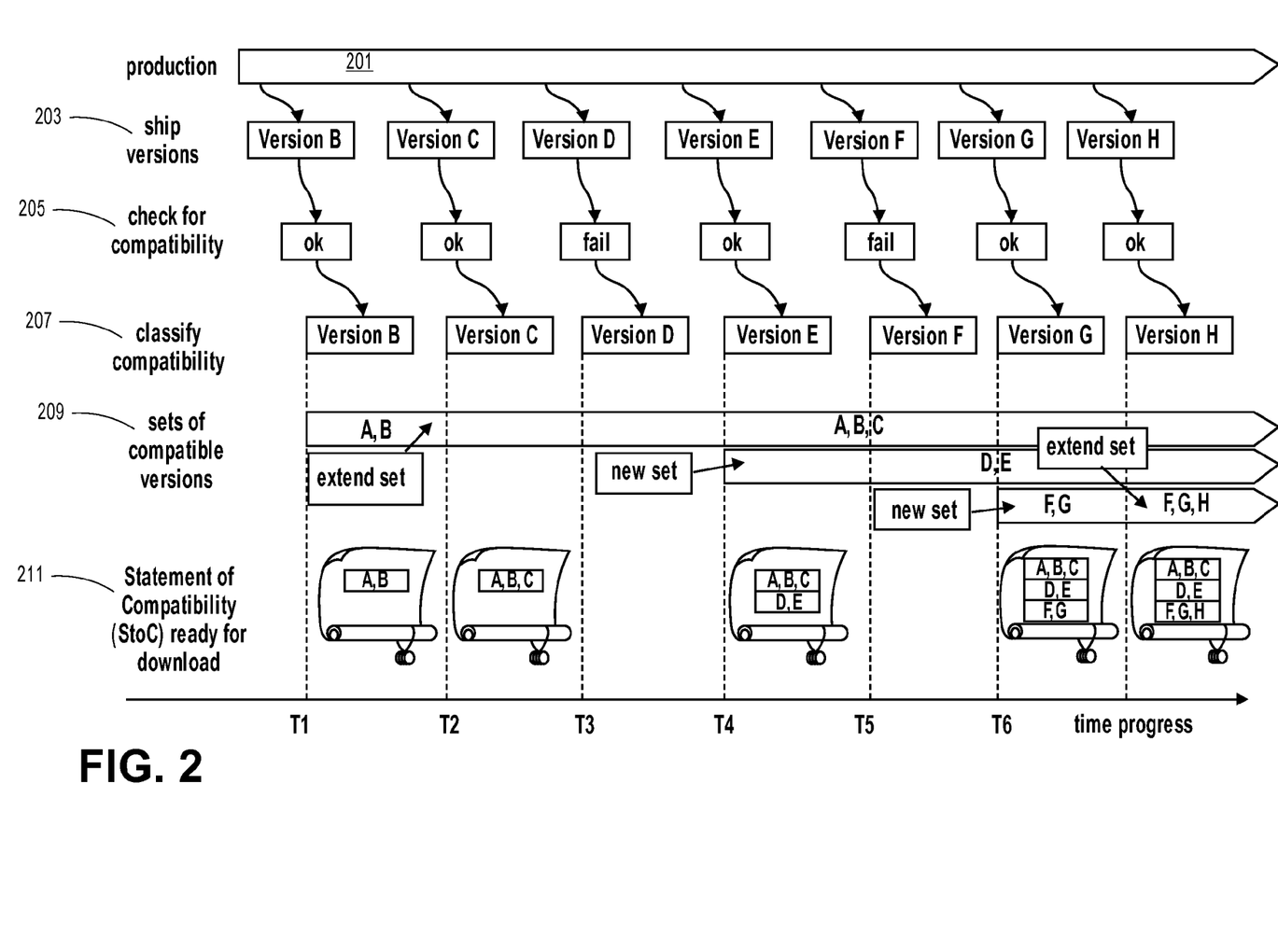
FIG. 2 is a diagram of one embodiment of an update scenario using an embodiment of the compatibility system.

FIG. 2 is a diagram of one embodiment of an update scenario using an embodiment of the compatibility system. The diagram depicts a timeline of a deployment of a software product that supports an embodiment of the compatibility system. The time line is divided into time segments labeled T1 . . . T7. The production 201 on this software product is continuous over the illustrated time from T1 through T7. As a result, different versions of the software are released at each of the labeled time segments. The initial version A is assumed to have been installed on the customer machines or servers. As each new version becomes available it is shipped 203 to the customer. This may be a physical distribution, digital distribution, download or similar distribution system. In the illustrated embodiment, after time point T1 a new version B ships. Versions C-H are released at time points T2-T7, respectively.

The software product developer tests each version for compatibility with preceding versions of the software product. The check for compatibility 205 produces a pass or fail result. In most cases, if a new version passes then it is considered compatible with the immediately preceding version and any versions that the preceding version is compatible with. If the new version fails then it is not compatible with any preceding version. For example, versions B and C pass the compatibility test. As a result, versions A, B and C are compatible with one another. In either case, each software version is assigned a classification 207 or version designation. Each version designation is unique in the form of a unique identifier or similar indicator that accompanies each associated software product component.

The results of the testing are used to generate or identify sets of compatible versions 209. The sets of compatible versions may be used by customers or system update software to determine when an update from one version to another version will require a complete halt to all machines and a parallel update or when a rolling update may be performed. For example, versions A, B and C form a set of compatible versions, versions D and E form a second set and versions F, G and H form a third set.

The software product developer uses the sets of compatibility to create a statement of compatibility 211. A statement of compatibility is a set of files, digital objects, or other data structures. The data can be stored in any format or organization. In one embodiment, the statement of compatibility is stored as an extensible mark-up language (XML) file or similar file. A statement of compatibility may be made available for download by customers so that their machines can utilize the statement during updates to determine automatically the optimal method for performing the update (e.g., deciding between a rolling update and parallel update). Each statement of compatibility may provide data regarding each set of compatible versions and each version of the software product. The statement of compatibility is updated with each new version that is shipped or a replacement statement of compatibility may be made available at any time. In some instances, discussed further below, a statement of compatibility is updated or altered absent the release of a new version of the software when incompatibilities are discovered after the release of the software product.

Figure 3:
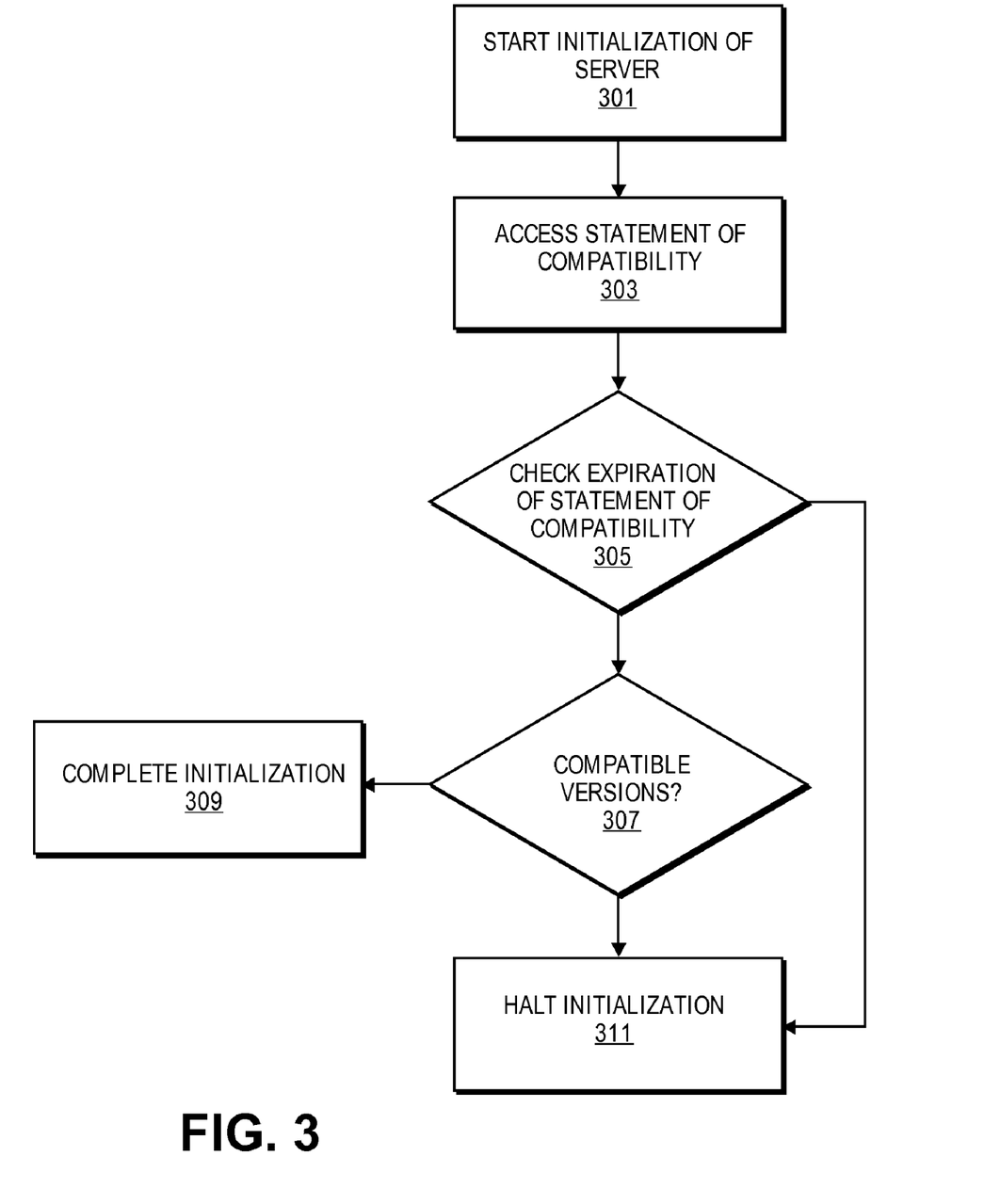
FIG. 3 is a diagram of one embodiment of a process for starting a server.

FIG. 3 is a diagram of one embodiment of a process for starting a server. In one embodiment, each server in a system of collaborating servers executes this process to ensure proper function of the system while also minimizing downtime for the system. A group of collaborating servers refers to servers that share any number of resources with one another, are interoperable with one another or communicate with one another. In another embodiment, this process is executed for each software component of a server or set of servers. For sake of clarity a single software product or server is described herein as executing the process. The process may scale and be applied to any number of software services, applications or components.

In one embodiment, the process starts during initialization of a server after or during an update of server software (block 301). In another embodiment, the process is initiated during the start of the update or installation of a new version of a software product. The software being updated, an installation program, a dedicated version control manager or similar update module accesses the statement of compatibility to retrieve the data therein (block 303). The data may be accessed from a local copy or from a remote copy of the statement of compatibility.

The process checks an expiration of the accessed statement of compatibility (block 305). Each statement of compatibility may have a fixed expiration date, time to live or similar indicator of validity. The software product developer can set the expiration date to any value or chose not set an expiration data. The expiration data can be used to guarantee that the statement of compatibility is good prior to its expiration and provide warning when the statement of compatibility is old that a new statement may be available or that the expired statement of compatibility is not reliable.

In one embodiment, if an expiration date has expired, then the process halts initialization of the server (block 311). This prevents an incompatible server with the updated version of the software product already installed from operating and causing an error when other servers without the update are operating. In another embodiment, the process aborts the installation or similar application performing an update or rolls back an update and continues to run the current version of the software product or the version of the product compatible with the other servers in the system. The system administrator may be notified of the incompatibility so that a time can be scheduled for the parallel update. In a further embodiment, the process automatically schedules the parallel update.

If an expiration date has not expired, then a check is made to determine if the new version to be run or installed is compatible with the other versions that are operating in collaboration with the initializing machine (block 307). A check involves a look up in the data of the statement of compatibility using the versions of collaboration machines and the version of the software for the server to be updated. A check will indicate compatibility if each of the versions is part of the same compatibility set. A check will also indicate incompatibility if the versions are not found in same compatibility set.

If the versions are not compatible, then the server update and initialization is halted or the update aborted, as discussed in regard to an expired statement of compatibility (block 311). If the versions of software on all of the collaborating servers are compatible, the initialization or installation process will continue until completion (block 309). The server after update may execute the new version indefinitely. In one embodiment, the check for compatibility is only run on the first installation or start up of the new version of the software if the software is compatible. In another embodiment, the check is made intermittently to detect changes amongst the set of collaborating servers. An administrator may configure the timing of compatibility checks or a default value can be used. An administrator can also initiate a check at any time. If the software is not compatible, then this compatibility check process is executed each time that the server or machine is restarted, intermittently, or at the initiation of the administrator. An administrator can also configure the timing of these checks or a default value may be used.

Figure 4:
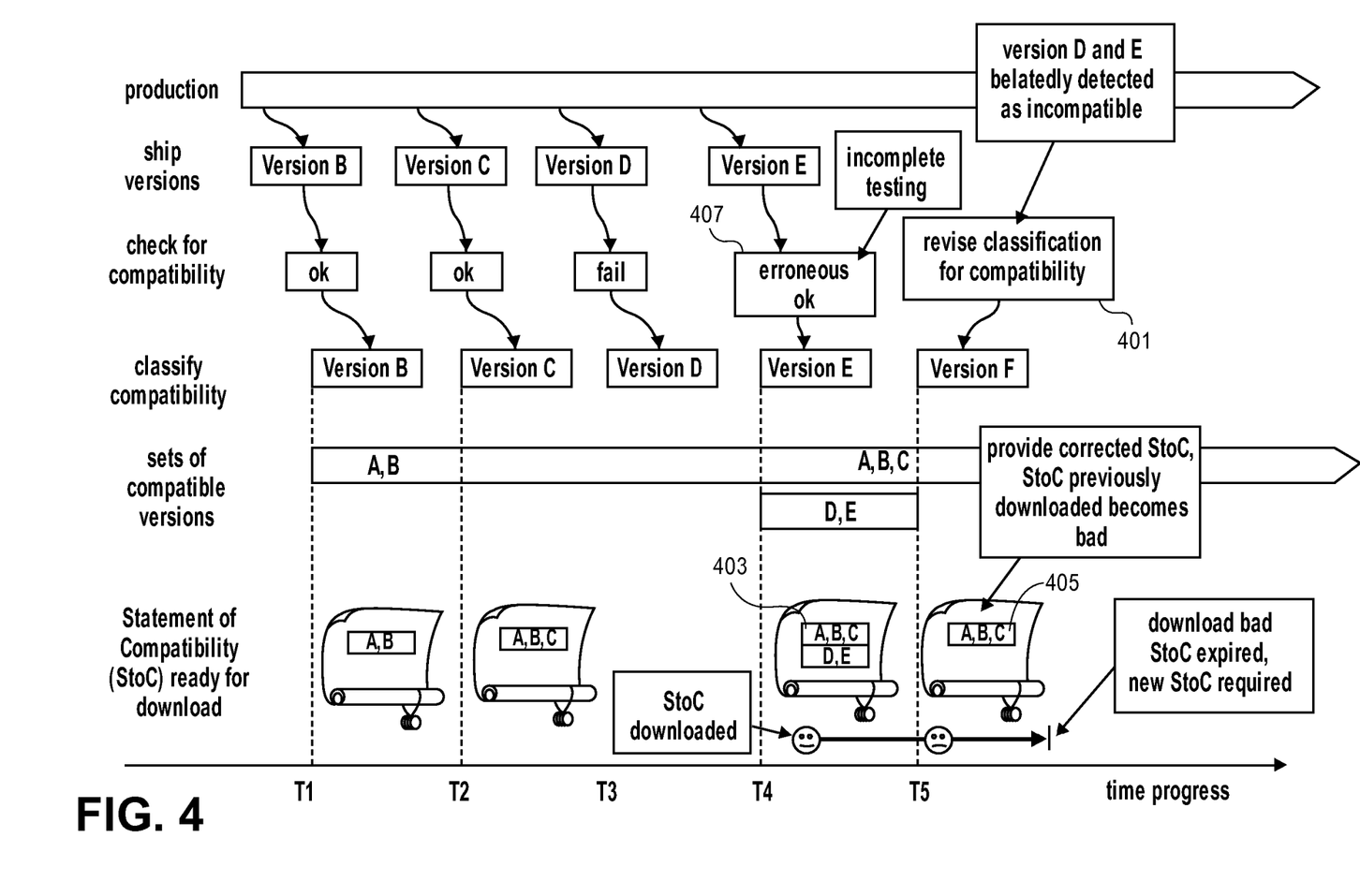
FIG. 4 is diagram of one embodiment of an update scenario with an updated statement of compatibility.

FIG. 4 is diagram of one embodiment of an update scenario where an updated statement of compatibility becomes available after the previous statement of compatibility is found to be inaccurate. In some scenarios, a testing of compatibility is incomplete or inaccurate 407. The testing may be inaccurate for any reason, including insufficient time for testing, overlooked testing cases or similar reasons. As a result of the incomplete testing an incorrect statement of compatibility 403 is issued. This may result in system errors or corruption during the time that the statement of compatibility is valid. However, after the expiration of the statement of compatibility the servers with the incorrect statement of compatibility will have to obtain a new statement of compatibility. The damage caused by the incorrect statement of compatibility is then limited to the duration of its validity. In one embodiment, the statements of compatibility default to a three month, six month, nine month or any duration of time setting. These expiration dates can be customized by a product developer or a system administrator or similar entity.

Upon determination of the error in the compatibility testing, discovered due to further testing, from customer feedback or similar information, a new assessment of compatibility 401 is generated that reflects the incompatibility. The revised compatibility data is used to generate and make available an accurate statement of compatibility 405. The revised statement of compatibility 405 is made available for download, automatically forwarded to the running software products or update modules or similarly provided to the customers. The servers and machines provided with a new statement of compatibility reinitialize in the same or similar manner to a newly updated or updating server. As a result, some servers may automatically be halted, halted upon their next initialization, may send notification of the incompatibility to a system administrator or take any combination of corrective measures.

Figure 5:
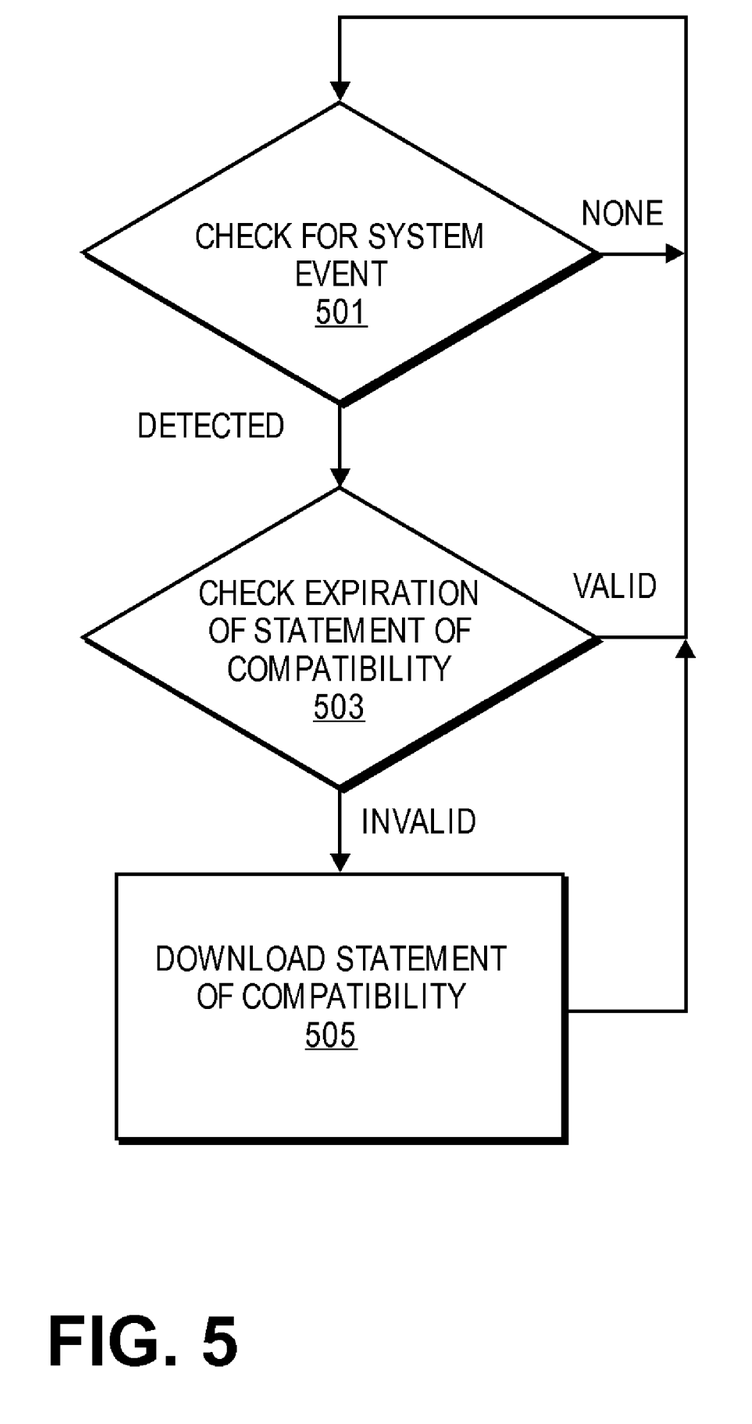
FIG. 5 is a process for updating a statement of compatibility.

FIG. 5 is a process for updating a statement of compatibility. In one embodiment, each server, software product, update module or similar component performs this process to ensure that the statement of compatibility is properly updated. This process is executed on a system or software product initialization, update, restart, at predetermined intervals or at similar times. The system administrator can also initiate this process at any time or set the timing for the process.

In one embodiment, the statement of compatibility update process intermittently makes a check for a system event (block 501). A system event is any activity in the server, software, system or similar space. The system event may be a system start up, system restart, server start up or restart, a notice or message from an external system or similar event. In one embodiment, a system event is a notification from the software product developer that a new statement of compatibility is available for download or similarly available. In one embodiment, if no system event is detected, then the process continues to wait until the system event is detected. The process can run indefinitely whenever the server is running.

In one embodiment, if a system event is detected, then a check is made to determine if the statement of compatibility has expired (block 503). In another embodiment, a check of statement of compatibility expiration is conducted for predetermined system events, but not for other system events (e.g., a notification of a new statement of compatibility may not cause an expiration check). If the statement of compatibility has not expired, then the process continues by waiting for the next system event to occur (block 501).

If the statement of compatibility has expired then a new statement of compatibility is accessed, downloaded or installed (block 505). The new statement of compatibility is accessed from a shared storage device in a specialized server that may be maintained separately by the system or may be similarly stored. The software or module performing the update can be executed on the same machine or is executed remotely by another machine in communication with the server or set of servers running the software product. The downloaded statement of compatibility may be stored with or overwrite the old statement of compatibility. The statement can be forwarded to collaborating machines, all machines in the system or similarly made available to all of the machines of the system that are collaborating with one another and running the software product.

Figure 6:
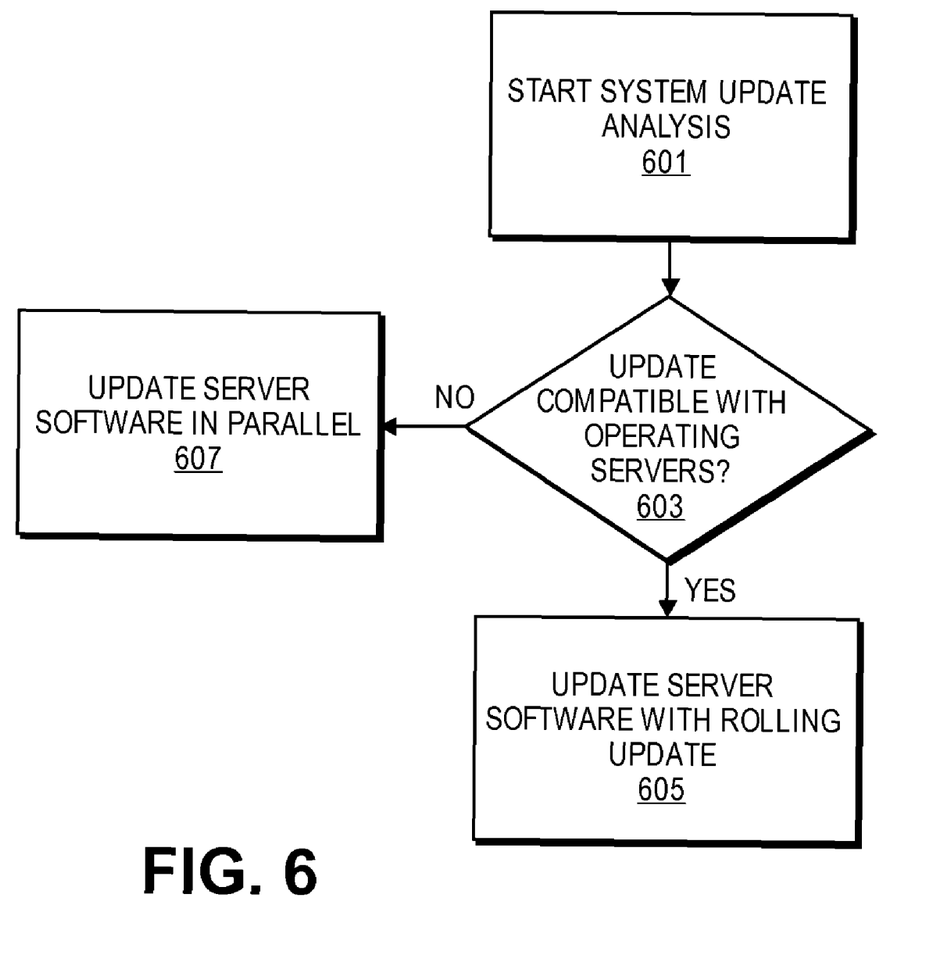
FIG. 6 is a flowchart of one embodiment of a process for automatic determination of a software update strategy.

FIG. 6 is a flowchart of one embodiment of a process for automatic determination of a software update strategy. In one embodiment, an update module or similar software component employs this process to determine an optimal update strategy. The process is initiated by a system administrator, receipt of an updated statement of compatibility or similar system event (block 601). The process is provided or has access to a statement of compatibility as well as data on each of the machines in a system including the versions of the software operating on each machine. This process can run on a single server amongst a set of collaborating servers or run on any number of the servers.

In one embodiment, the process checks to determine if an update for a machine in the system would be compatible with other operating machines in the system (block 603). This process is applied to each machine that is designated for an update before a determination or recommendation for updating any machine is made. In another embodiment, the process applies the analysis on a machine by machine basis. A system administrator can configure the analysis to weight or select specific update strategies for specified input parameters to favor selected system conditions over others for the decision between parallel and rolling updates.

In one embodiment, if a system update is compatible between a machine designated for an update and other operating machines in the system then the designated machine is instructed to update automatically via a rolling update (block 605). In another embodiment, a notice or display of compatibility is generated for a system administrator or user to allow confirmation of the decision, implement the decision or allow the administrator or user to adjust the parameters or instructions to execute the update or re-execute the analysis.

If the system update is not compatible for a machine with another machine in the system then a simultaneous or parallel update is recommended or executed (block 607). In one embodiment, a rolling update is approved for a sub-set of machines in a system. If services can be maintained for clients of the servers in the system, then a rolling update can be approved for the sub-set of machines. In one embodiment, if the number of machines to be updated that will become incompatible with other collaborating machines exceeds the number of machines in the system that will remain compatible or if machines to be updated are a majority of the machines, then the rolling update may be recommended or scheduled to proceed, because the rolling update would be less disruptive and include less total downtime than a parallel update for all of the machines. Similar scenarios may be identified by a system administrator or included as default scenarios. The update strategy process searches for and detects any number of scenarios and weights any number of factors in making the decision as specified by the product developer, system administrator or similar entity.

Figure 7:
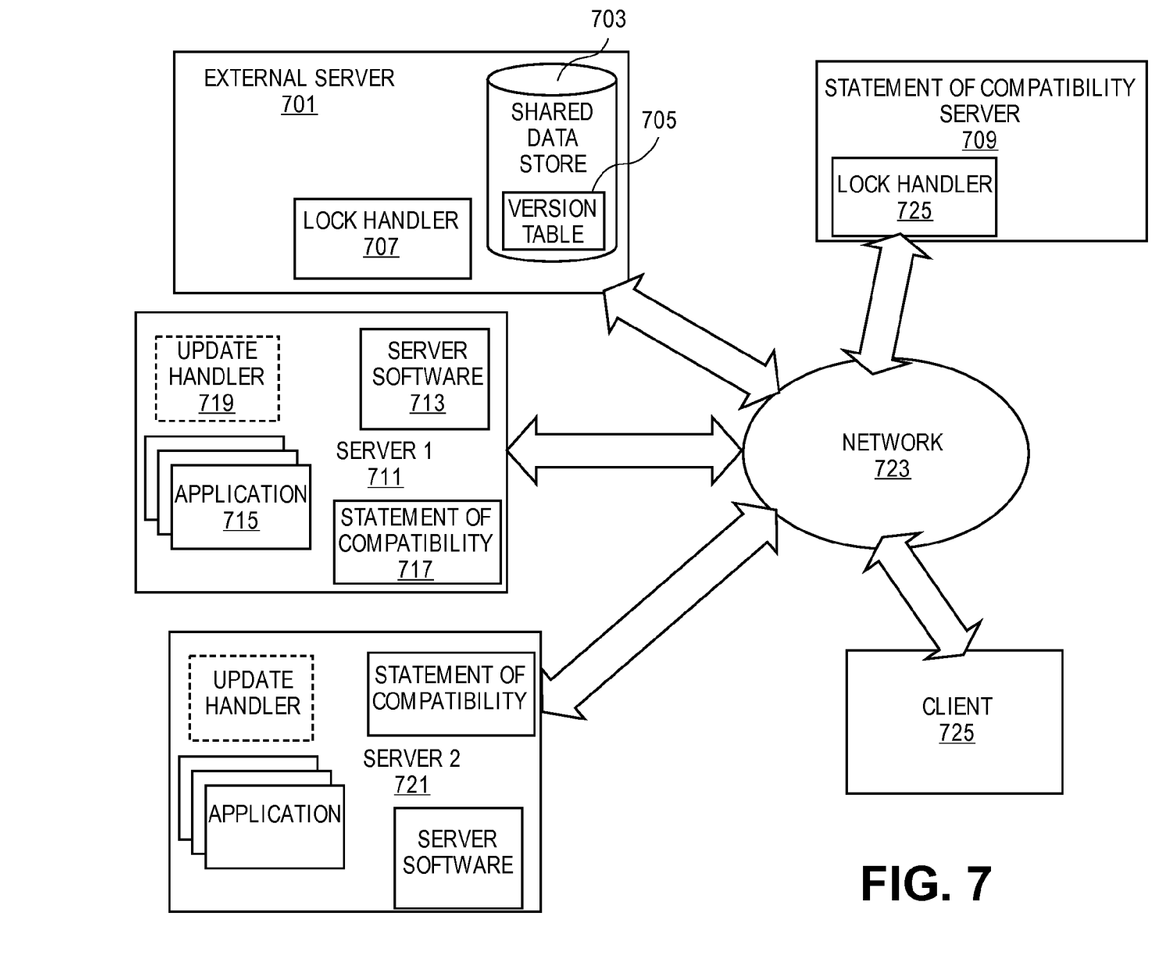
FIG. 7 is a diagram of one embodiment of a system compatibility checking system.

FIG. 7 is a diagram of one embodiment of a system compatibility checking system. In one embodiment, the system includes a set of servers 711, 721 to provide services to a set of clients 725. Any number of clients may obtain services from any number of services or applications 715 hosted on each server. The clients 725 connect to the servers 711, 721 via a network 723 or similar communication system. The network 723 may be a local area network (LAN), wide area network (WAN), such as the Internet, or a similar network.

Each server 711, 721 also includes server software 713 to allow each server to offer the services of the applications 715. The server software 713, applications 715 and similar software related to each server may be updated by an update module 719 or similar software module. Each application 715, server software module 713 or similar software has a version number associated with it. If the software for any of these components is updated, the new updated software typically has a new version number that must be checked against the versions of the applications or server software on other machines to determine compatibility.

The update module 719 performs the compatibility check and determines whether an update of server software is performed or completed. The update module 719 may check a local statement of compatibility 717 or a statement of compatibility obtained from a remote server. The remote server may provide any number of services or may be a dedicated statement of compatibility server 709. A lock handler 725 is utilized to manage access to the data provided by the statement of compatibility server 709.

In one embodiment, new statements of compatibility are obtained or old statements of compatibility are renewed from an external remote server 701. The external server 701 maintains a data store 703 containing a version table 705 tracking the characteristics of each version to allow determination of the compatibility of different versions of a software product. The data store 703 also stores each version of a statement of compatibility for a software product as it evolves over time. A lock handler 703 is utilized to manage access to the data provided by the external server 701. In one embodiment, the external server is maintained by the product developer or third party responsible for maintaining server compatibility. In another embodiment, the external server 701 is at least partially maintained by a customer or related entity.

In one embodiment, the system update compatibility system including the update module is implemented as hardware devices. In another embodiment, these components are implemented in software (e.g., microcode, assembly language or higher level languages). These software implementations may be stored on a machine-readable medium. A "machine readable" medium includes any medium that can store or transfer information. Examples of a machine readable medium include a ROM, a floppy diskette, a CD-ROM, a DVD, flash memory, hard drive, an optical disk or similar medium.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method comprising:
   starting initialization of a first server;
   retrieving a statement of compatibility from a remote storage location;
   checking an expiration of the statement of compatibility;
   checking compatibility between an update for software of the first server and software of a second collaborating server based on the statement of compatibility, the statement of compatibility defining sets of compatible versions of the software;
   selecting automatically one of a parallel update process and a rolling update process to install the update based on the checking of the compatibility, the parallel update process to update the software of the first server for an update that is incompatible with the software of the second collaborating server by updating the software of the first server and the second collaborating server at a same time and the rolling update process to update the software of the first server for an update that is compatible with the software of the second collaborating server while the second collaborating server executes another compatible version of the software;
   scheduling automatically the parallel update process in response to the expiration of the statement of compatibility; and
   executing a selected update process.

2. The method of claim 1, further comprising:
   halting initialization of the first server if incompatibility with the software of the second collaborating server is determined through the statement of compatibility.

3. The method of claim 1, further comprising:
   halting initialization or update of the software of the first server if the statement of compatibility is expired.

4. The method of claim 1, wherein the statement of compatibility is in a shared storage area of the remote storage location.

5. The method of claim 1, further comprising:
   updating a table in a shared storage area to indicate a version of the first server.

6. The method of claim 1, further comprising:
   receiving an update to an expiration date of the statement of compatibility.

7. A system comprising:
   a first server to provide a first application to a client;
   a storage system to store compatibility data; and
   a second server to provide a second application to the client, the second server sharing resources with the first server, the second server to check the expiration of the compatibility data and intercompatibility of the first application and an update of the second application using the compatibility data prior to update of the second application on the second server, the second server to select any one of a parallel or a rolling update to update the second application based on the check of the compatibility data, the parallel update to update the second application of the second server for an update that is incompatible with the first application of the first server at a same time that the first application is updated and the rolling update to update the application of the second server for an update that is compatible with the first application of the first server while the compatible first application is executed by the first server, the second server to schedule automatically the parallel update process in response to the expiration of the compatibility data.

8. The system of claim 7, further comprising:
   an update module to update compatibility data automatically.

9. The system of claim 7, wherein the second server compares version data to the compatibility data to determine compatibility of the update of the second application with the first application.

10. The system of claim 7, wherein the compatibility data indicates compatible software versions of the first application and the second application.

11. A non-transitory machine readable medium having a set of instructions stored therein which when executed cause a machine to perform a set of operations comprising:
   receiving an updated server software for a first server, the first server sharing resources with server software of a second server;
   checking an expiration of a statement of compatibility;
   checking compatibility of the updated server software with the server software of the second server through a statement of compatibility stored in a shared storage module, the statement of compatibility defining sets of compatible versions of server software;
   selecting automatically one of a parallel update process and a rolling update process to install the updated server software based on the checking of the compatibility, the parallel update process to update the server software of the first server for updated server software that is incompatible with the server software of the second server at a same time the server software of the second server is updated and the rolling update process to update the server software of the first server for updated server software that is compatible with the server software of the second server while the second server is executing the compatible server software; and scheduling automatically the parallel update process in response to the expiration of the statement of compatibility.

12. The non-transitory machine readable medium of claim 11, having a further set of instruction stored therein which when executed cause a machine to perform a set of operations further comprising:

downloading the statement of compatibility from a remote server.

13. The non-transitory machine readable medium of claim 11, having a further set of instructions stored therein which when executed cause a machine to perform a set of operations further comprising:

halting initialization of the first server if the statement of compatibility is expired.

14. The non-transitory machine readable medium of claim 11, having a further set of instructions stored therein which when executed cause a machine to perform a set of operations further comprising:

performing a rolling update of all servers being updated to compatible versions based on the statement of compatibility.

15. The non-transitory machine readable medium of claim 11, having a further set of instructions stored therein which when executed cause a machine to perform a set of operations further comprising:

receiving an update to an expiration date of the statement of compatibility.

* * * * *